United States Patent
Boldi et al.

(10) Patent No.: US 11,122,547 B2
(45) Date of Patent: Sep. 14, 2021

(54) SYSTEM AND METHOD FOR ALLOWING COOPERATION BETWEEN A PLURALITY OF RADIO NODES IN A TELECOMMUNICATION NETWORK

(71) Applicant: TELECOM ITALIA S.p.A., Milan (IT)

(72) Inventors: Mauro Renato Boldi, Turin (IT); Paolo Gianola, Turin (IT); Bruno Melis, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 51 days.

(21) Appl. No.: 15/781,903

(22) PCT Filed: Dec. 29, 2015

(86) PCT No.: PCT/EP2015/081349
§ 371 (c)(1),
(2) Date: Jun. 6, 2018

(87) PCT Pub. No.: WO2017/114562
PCT Pub. Date: Jul. 6, 2017

(65) Prior Publication Data
US 2018/0359739 A1    Dec. 13, 2018

(51) Int. Cl.
*H04W 72/04* (2009.01)
*H04B 1/38* (2015.01)
(Continued)

(52) U.S. Cl.
CPC .......... *H04W 72/0406* (2013.01); *H04B 1/38* (2013.01); *H04B 7/024* (2013.01);
(Continued)

(58) Field of Classification Search
None
See application file for complete search history.

(56) References Cited

U.S. PATENT DOCUMENTS 9,924,375 B1*  3/2018  Park ................... H04B 7/022
2012/0281551 A1* 11/2012 Alanara ............. H04L 27/2607
370/252

(Continued)

FOREIGN PATENT DOCUMENTS

EP    2 525 623 A2   11/2012
EP    2 753 143 A1    7/2014

OTHER PUBLICATIONS

Bhaumik, S., et al., "Breathe to Stay Cool: Adjusting Cell Sizes to Reduce Energy Consumption", Green Networking 2010, Aug. 30, 2010, New Delhi, India. (Year: 2010).*

(Continued)

*Primary Examiner* — Faruk Hamza
*Assistant Examiner* — Cassandra L Decker
(74) *Attorney, Agent, or Firm* — Oblon, McClelland, Maier & Neustadt, L.L.P.

(57) ABSTRACT

A mobile telecommunication network including plural network elements, divided into at least two clusters. Each cluster includes: plural remote units corresponding to network elements, arranged for exchanging radiofrequency signals with user equipment located within at least one respective served area; a central unit corresponding to a network element arranged for managing the exchange of radiofrequency signals with the user equipment located within the served areas of each remote unit of the cluster, and plural connections, each for operatively connecting a remote unit with the central unit of the same cluster. At least one remote unit of a first cluster is further connected to a central unit of the second cluster, at least one respective served area of the at least one remote unit of the first cluster being adjacent to at least one further respective served area of a further remote unit of the second cluster.

19 Claims, 8 Drawing Sheets

(51) Int. Cl.
*H04W 92/20* (2009.01)
*H04B 7/024* (2017.01)
*H04W 92/22* (2009.01)
*H04W 92/12* (2009.01)
*H04W 88/08* (2009.01)

(52) U.S. Cl.
CPC ...... *H04W 72/0426* (2013.01); *H04W 88/085* (2013.01); *H04W 92/12* (2013.01); *H04W 92/20* (2013.01); *H04W 92/22* (2013.01)

(56) References Cited

U.S. PATENT DOCUMENTS

| | | | | |
|---|---|---|---|---|
| 2012/0281555 A1* | 11/2012 | Gao | .................. | H04L 5/0051 370/252 |
| 2012/0329498 A1* | 12/2012 | Koo | .................. | H04L 5/0073 455/501 |
| 2013/0017852 A1 | 1/2013 | Liu et al. | | |
| 2013/0064230 A1* | 3/2013 | Chun | .................. | H04B 7/024 370/336 |
| 2013/0070816 A1* | 3/2013 | Aoki | .................. | H04W 72/046 375/219 |
| 2014/0044054 A1* | 2/2014 | Kim | .................. | H04B 7/024 370/329 |
| 2014/0212129 A1* | 7/2014 | Huang | .................. | H04B 10/25 398/2 |
| 2014/0342768 A1* | 11/2014 | Soldati | .................. | H04W 52/241 455/522 |
| 2015/0244430 A1* | 8/2015 | Shattil | .................. | H04L 5/0023 370/254 |
| 2015/0349908 A1* | 12/2015 | Centonza | .................. | H04W 52/36 370/329 |
| 2015/0358030 A1* | 12/2015 | Xia | .................. | H03M 7/3082 341/87 |
| 2016/0119826 A1* | 4/2016 | Huh | .................. | H04W 36/04 370/332 |
| 2016/0192181 A1* | 6/2016 | Choi | .................. | H04B 7/26 455/422.1 |
| 2016/0278061 A1* | 9/2016 | Peng | .................. | H04L 43/16 |
| 2017/0064722 A1* | 3/2017 | Tarlazzi | .................. | H04B 17/12 |
| 2018/0234875 A1* | 8/2018 | Leroudier | .................. | H04W 88/085 |

OTHER PUBLICATIONS

International Search Report and Written Opinion dated Sep. 19, 2016, in PCT/EP2015/081349 filed Dec. 29, 2015.

* cited by examiner

SYSTEM AND METHOD FOR ALLOWING COOPERATION BETWEEN A PLURALITY OF RADIO NODES IN A TELECOMMUNICATION NETWORK

BACKGROUND OF THE INVENTION

Field of the Invention

The present invention relates to telecommunication systems and methods for managing thereof. In detail, embodiments of the present invention relate to radio access systems in mobile networks and methods for managing thereof. In more detail, embodiments of the present invention refer to radio access networks employing cloud architectures, such as for example Cloud (or Centralized) Radio Access Network, C-RAN, architecture.

Overview of the Related Art

Radio access networks employing cloud architectures offer an improved efficiency and management of network resources from the point of view of both hardware equipment and radio signal resources exploited for providing communication to user equipment.

Generally, cloud architectures comprise one or more Central Units, or CUs, each of which is connected to a plurality of radio nodes or Remote Units, or RUs, preferably by means of a fiber optic cable, or fiber link. In addition, the CUs are connected to the core network of a mobile telecommunication network.

Typically, the CU performs the signal processing operations of a traditional base station, or BS, equipment including signal processing at higher layer protocols (RRC/RLC/MAC) and preferably at the physical layer (L1) up to the generation of a digital baseband signal (for this reason the CU is also denoted as BaseBand Unit, or BBU).

In the Down Link, or DL (i.e., transmission from the mobile telecommunication network to user equipment, such as for example cellular phones and smartphones), the digital baseband signal is converted from electric signal to optical signal, or E/O conversion, and transmitted over the fiber link to a RU selected to radiate a radiofrequency signal based on the digital baseband signal (for this reason the RUs are also denoted as Remote Radio Head, or RRH).

At the selected RU, the composite baseband signal that is first converted from optical signal to electric signal, or O/E conversion. The signal is then filtered by a front-end module, converted from digital to an analog signal, or D/A conversion, up-converted from baseband to radiofrequency, or RF conversion, amplified by a power amplifier and radiated by the antennas of the selected RU.

In the Up Link, or UL (i.e., transmission from user equipment to the mobile telecommunication network), a RU receives analog radiofrequency signals transmitted by a user equipment, down-converts such radiofrequency signals into digital baseband signals and subject them to a E/O conversion before transmitting them to the central unit through a fronthaul link. Generally a fronthaul link is based on a physical connection (even though fronthaul links based on radio communication are not excluded), for example comprising fiber optic cables, also indicated as fiber links.

Alternative cloud architectures are also feasible. International patent applications WO2010/075864 and WO2010/075865 of the same Applicant disclose cloud architectures based on different functional splits between CU and RUs (i.e., a different distribution of signal processing capabilities between CU and RUs).

For example, further implementations of cloud architecture may envisage that the signal processing at the physical layer is shared between CU and RUs, or that all signal processing at the physical layer is performed by RUs, while the higher layer protocols are processed in the CU. Moreover, further cloud architectures may envisage that even some functionalities of the higher level protocols, such as data link layer (L2) is processed by RUs while the remaining functionalities of the higher level protocols are processed by the CU.

Dependently on the functional split between CU and RUs implemented in the cloud architecture, the digital interface between CU and RU implements different protocols and/or requires different bandwidths.

A set of RUs may be managed according to operating schemes and/or algorithms and is generally indicated as Coordinated MultiPoint, or CoMP, set. The CoMP set encompasses the plurality of RUs connected to a common CU to obtain an improvement of the Quality of Service, or QoS, both in downlink and in uplink.

For example, a CoMP set may implement a joint processing of the RUs signals, conveniently serving users equipment by a plurality of nodes of the mobile telecommunication network (i.e. RUs in C-RAN) instead of one node of the mobile telecommunication network as in a classical mobile telecommunication network architecture.

A benefit of implementing a CoMP set is particularly relevant for those users equipment located at the edge of an area, or cell, served by a RU. Indeed, in traditional RAN architectures, communication of users equipment located at cell edges are subjected to 'border effect', i.e. high interferences, due to communication of user equipment in neighboring cells, with a consequent poor quality of experience for the user (i.e., low QoS). On the contrary, by implementing a CoMP set, RUs managing communication in neighboring cells coordinate signal transmission in order to reduce interferences.

In addition or in alternative, RUs operation may be coordinated in order to implement Carrier Aggregation, or CA, technique. CA technique comprises transmitting signals at a same time by using different portions (e.g., in 800 MHz and 1800 MHz bands for the case of LTE) of an available spectrum.

Generally, the RUs connected to a same CU form the so-called 'cluster' of RUs. A RUs cluster comprise a number of RUs (which may vary from two up to hundreds RUs) limited by a plurality of factors such as for example technical and/or computational constraints in the CU, the distance between CU and RUs in terms of physical length of the connection (i.e., of the fiber link) and/or functional split implemented.

In summary a plurality of cloud architectures and management methods thereof are known in the art. For example, China Mobile Research Institute, "C-RAN The Road Towards Green RAN", White Paper, Version 2.5, October 2011, discloses the architectures, benefits of C-RAN architecture and provides a research framework by identifying the technical challenges of C-RAN architecture.

International patent application WO 2013/163597 discloses a method for operating an interference coordinating entity (ICE) that includes partitioning, by the ICE, a cloud radio access network (CRAN) cluster by grouping transmission points serving user equipment in accordance with a partitioning criterion into at least one virtual transmission point (V-TP) to produce a V-TP set. UE to be served are preferably offset from a V-TP boundary. The method also includes saving, by the ICE, V-TP information to a memory.

U.S. Pat. No. 8,908,602 discloses a mobile communication system that includes a plurality of remote radio heads configured to transmit a signal to user equipment and configure an antenna network and a centralized baseband pool configured to be connected to the antenna network. The centralized baseband pool performs clustering with respect to the plurality of remote radio heads so as to dynamically vary the number of the remote radio heads each included in a plurality of clusters.

SUMMARY OF THE INVENTION

The Applicant has observed that known systems and methods provide unsatisfactory mobile telecommunication networks layouts based on cloud architectures.

The Applicant has observed that in known mobile telecommunication networks based on cloud architectures substantial inter cluster interferences may arise. Particularly, border effects may occur at the boundaries between different clusters, thus reducing a quality of service and/or a quality of experience for user equipment that happen to communicate along cluster boundaries.

The Applicant has found that is possible to lower, or even suppress, border effects at the boundaries of neighboring clusters by implementing interferences control/suppression schemes among RUs of different clusters.

Particularly, the Applicant has found that is possible to reduce border effects at boundaries of neighboring clusters by exchanging and/or sharing radio resources pooled at a certain time in a single CU among two or more CUs.

The exchanging and/or sharing of information and radio resources among two or more CUs managing neighboring clusters, enables the RUs of the clusters, especially RUs at clusters borders, to be conveniently managed by more than a single CU. This results in an improved and shared provision of service to user equipment located near the borders of neighboring clusters.

Particularly, one aspect of the present invention proposes a mobile telecommunication network comprising a plurality of network elements, the network elements being divided in at least two clusters. Each cluster comprises: a plurality of remote units corresponding to network elements, each remote unit being arranged for exchanging radiofrequency signals with user equipment located within at least one respective served area; a central unit corresponding to a network element arranged for managing the exchange of radiofrequency signals with the user equipment located within the served areas of each remote unit of the cluster, and a plurality of connections, each for operatively connecting a remote unit with the central unit of the same cluster. At least one remote unit of a first cluster is further connected to a central unit of the second cluster, at least one respective served area of the at least one remote unit of the first cluster being adjacent to at least one further respective served area of a further remote unit of the second cluster, thereby allowing both the central unit of the first cluster and the central unit of the second cluster to manage communication with user equipment through the at least one remote unit.

Preferred features of the present invention are set forth in the dependent claims.

In an embodiment of the invention, the at least one remote unit of the first cluster is further connected to the central unit of a second cluster by means of a direct connection.

In an embodiment of the invention, the direct connection comprises an optical fiber cable.

In an embodiment of the invention, the central unit of the first cluster and the central unit of the second cluster are configured for exchanging coordination information through the direct connection connecting the central unit of the second cluster with the at least one remote unit, the at least one remote unit, and the connection operatively connecting the at least one remote unit with the central unit of the first cluster.

In an embodiment of the invention, the central unit of the first cluster is connected to the central unit of the second cluster by means of a further direct connection.

In an embodiment of the invention, the central unit of the first cluster and the central unit of the second cluster are configured for exchanging coordination information through the further direct connection.

In an embodiment of the invention, the at least one remote unit of the first cluster of the at least two clusters is further connected to the central unit of the second cluster through a respective connection operatively connecting the at least one remote unit with the central unit of the first cluster, the central unit of the first cluster, and the further direct connection connecting the central unit of first cluster with the central unit of the second cluster.

In an embodiment of the invention, the remote units of the a plurality of remote units are arranged for exchanging radiofrequency signals at two frequency layers of which a first frequency layer comprises a corresponding first frequency range lower than a second frequency range of a second frequency layer. Preferably, the central unit of the first cluster and the central unit of the second cluster manage the least one remote unit for exchanging radiofrequency signals at both the first frequency layer and the second frequency layer.

Another aspect of the present invention proposes a network element of a mobile telecommunication network. The network element comprises at least one radio head transceiver arranged for generating and radiating radiofrequency signals to user equipment located within at least one served area, and a coordinating member connected to at least two further network elements for receiving operating signals therefrom, and connected to the at least one radio head transceiver for providing processed signals thereto, based on the received operating signals. The radiofrequency signals are generated by the at least one radio head transceiver based on the processed signals.

In an embodiment of the invention, operating signals received from the at least two further network elements comprise signals in the time domain. Preferably, the coordinating member comprises a signal selection module configured for selecting signals received from a first further network element or from a second further network element of the at least two further network elements as processed signals to be provided to the at least one radio head transceiver.

In an embodiment of the invention, the at least one radio head transceiver is arranged for receiving radiofrequency signals and converting the radiofrequency signals into down-converted signals. Preferably, the coordinating member comprises a signal routing module configured for receiving the signals in the time domain from the at least one radio head transceiver and providing each signal in the time domain to the first further network element or to the second further network element.

In an embodiment of the invention, operating signals received from the at least two further network elements comprise signals in the frequency domain. Preferably, the coordinating member comprises a signals addition module configured for adding the signals in the frequency domain in a processed signal to be provided to the at least one radio head transceiver.

In an embodiment of the invention, the at least one radio head transceiver is arranged for receiving radiofrequency signals and converting the radiofrequency signals into corresponding down-converted signals. Preferably, the coordinating member comprises a signal de-multiplexer module configured for receiving the down-converted signals from the at least one radio head transceiver and decomposing each down-converted signal in corresponding signals in the frequency domain and providing each signal in the frequency domain to the first further network element or to the second further network element.

In an embodiment of the invention, operating signals received from the at least two further network elements comprise resource blocks. Preferably, the coordinating member comprises a resource blocks combining module configured for combining resource blocks in a processed signal to be provided to the at least one radio head transceiver.

In an embodiment of the invention, the at least one radio head transceiver is arranged for receiving radiofrequency signals and converting the radiofrequency signals in corresponding signals. Preferably, the coordinating member comprises a resource block de-multiplexer module configured for receiving the signals from the at least one radio head transceiver and decomposing each signal in corresponding resource blocks and providing each resource block to the first further network element or to the second further network element of the at least two further network elements.

Another aspect of the present invention proposes a method of managing network elements of a telecommunication network. The network elements are divided in at least two clusters, each cluster comprises: a plurality of remote units corresponding to network elements arranged for exchanging radiofrequency signals with user equipment located within at least one respective served area, and a central unit corresponding to a network element arranged for managing the exchanging radiofrequency signals with the user equipment located within the served areas of each remote unit of the cluster. The method comprises: receiving, at an at least one remote unit, operating signals from a first central unit of a first cluster and from a second central unit of a second cluster; processing, at the at least one remote unit, said operating signals from the first central unit and from the second central unit for providing at least one corresponding radio frequency signal, and radiating, at the at least one remote unit, the at least one corresponding radiofrequency signals over the at least one respective served area.

In an embodiment of the invention, the method further comprises having the first central unit of the first cluster and the second central unit of the second cluster exchanging respective signals management information. Preferably, the method further comprises also having both the first central unit of the first cluster and the second central unit of the second cluster generating the operating signals on the basis of the exchanged signals management information in order to reduce interference between at least one corresponding radiofrequency signals radiated by the at least one remote unit of the first cluster and radiofrequency signals radiated by a further remote unit of the second cluster. Preferably, at least one respective served area of the at least one remote unit of the first cluster is adjacent to at least one further respective served area of the further remote unit of the second cluster.

In an embodiment of the invention, signals management information comprises scheduling grants and/or interference measurements referred to radiofrequency signals exchanged with user equipment within the at least one respective served area and the at least one further respective served area.

BRIEF DESCRIPTION OF THE DRAWINGS

These and others features and advantages of the solution according to the present invention will be better understood by reading the following detailed description of an embodiment thereof, provided merely by way of non-limitative examples, to be read in conjunction with the attached drawings, wherein.

DETAILED DESCRIPTION OF THE INVENTION

Figure 1:
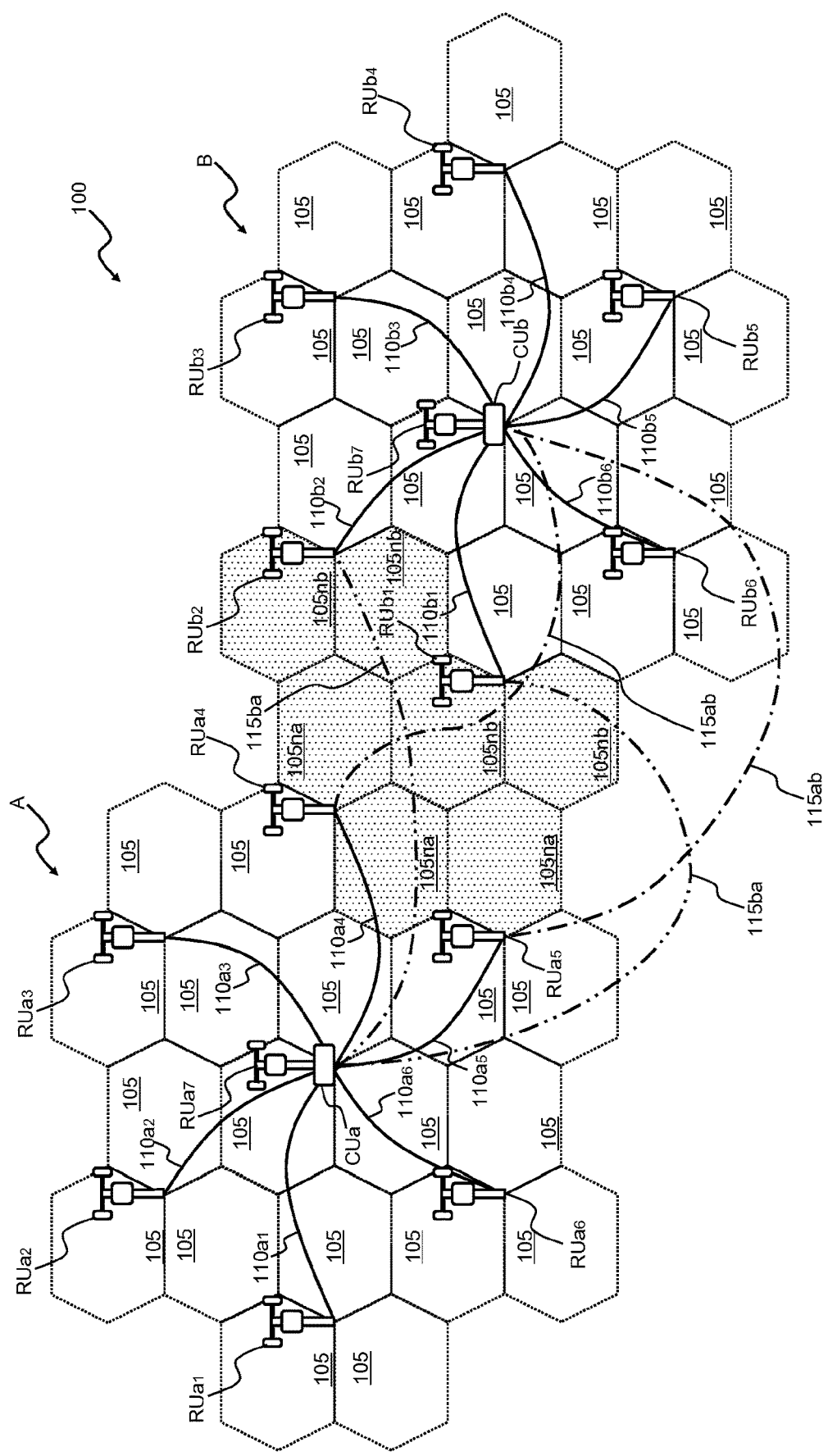
FIG. 1 is a schematic representation of two neighboring clusters of a mobile telecommunication network implementing a cloud architecture according to an embodiment of the invention.

With reference to the drawings, FIG. 1 is a schematic representation of two neighboring clusters A and B of network elements of a mobile telecommunication network 100 (e.g., a Long Term Evolution/Long Term Evolution—Advanced, LTE/LTE-A mobile telecommunication network) implementing a cloud architecture according to an embodiment of the invention.

Each cluster A and B, comprise a central network element or Central Unit (CU) CUa and CUb, respectively, and a plurality of remote network elements (seven in the example of FIG. 1) or Remote Units (RU) $RUa_{1-7}$ and $RUb_{1-7}$, respectively.

Central units CUa and CUb and remote units $RUa_{1-7}$ and $RUb_{1-7}$ provide communications to (i.e., serve) one or more user equipment (e.g., cellular telephones, smartphones, tablets, and generally any devices comprising networking equipment capable of connecting to a mobile telecommunication network, not shown in FIG. 1) over a predetermined geographic region. Particularly, each remote unit $RUa_{1-7}$ and RUb$_{1-7}$ provides communications over one or more (e.g., three) served areas, or cells 105 (depicted as hexagons in FIG. 1).

Each central unit CUa and CUb is connected to remote units RUa$_{1-7}$ or RUb$_{1-7}$ of the respective cluster A or B by means of a corresponding so-called 'fronthaul link' 110a$_{1-6}$ or 110b$_{1-6}$ (the fronthaul link connecting central unit CUa and CUb to remote unit RUa$_7$ and RUb$_7$, respectively, is not shown in FIG. 1 for the sake of simplicity). Preferably, fronthaul links 110a$_{1-6}$ and 110b$_{1-6}$ are physical connections (even though fronthaul links based on radio communication are not excluded), for example comprising fiber optic cables, also indicated as fiber links.

In addition, each central unit CUa and CUb is connected to a core network (not shown) of the mobile telecommunication network 100.

Each central unit CUa and CUb manages communications occurring among remote units RUa$_{1-7}$ or RUb$_{1-7}$ and user equipment within the cells 105 by exchanging data through the fronthaul links 110a$_{1-6}$ and 110b$_{1-6}$.

Generally, in Down Link, or DL (i.e., transmission from mobile telecommunication network 100 to user equipment), the central units CUa and CUb perform the signal processing operations including operations at the higher ISO-OSI layer protocols (RRC/RLC/MAC). Preferably, central units CUa and CUb also perform signal processing operations at the physical layer (L1), thus generating digital baseband signals to be transmitted to user equipment (for this reason the central units CUa and CUb are also denoted as BaseBand Units, or BBUs) through remote units RUa$_{1-7}$ or RUb$_{1-7}$ serving the cells 105 where the user equipment are located.

Central units CUa and CUb convert each generic digital baseband signal from an electric signal to an optical signal (process indicated as 'E/O conversion'), and transmit the optical signal over a fronthaul link 110a$_{1-6}$ or 110b$_{1-6}$ connected to a selected remote units RUa$_{1-7}$ or RUb$_{1-7}$ serving a cell 105 in which the user equipment recipient of the digital baseband signal is located.

At the selected remote unit RUa$_{1-7}$ or RUb$_{1-7}$, baseband signal is first converted from an optical signal to an electric signal (process indicated as 'O/E conversion'). The baseband signal is then filtered, converted from a digital signal to an analog signal (process indicated as 'D/A conversion'), up-converted from baseband to radiofrequency, amplified and finally radiated (for this reason the remote units RUa$_{1-7}$ or RUb$_{1-7}$ are also denoted as Remote Radio Heads, or RRHs) in the served cell 105 where the recipient user equipment is located.

In Up Link, or UL (i.e., transmission from the user equipment to the mobile telecommunication network 100), a radiofrequency signal from a sender user equipment is received by the remote unit RUa$_{1-7}$ or RUb$_{1-7}$ serving the cell 105 where the sender user equipment is located, amplified, down-converted, converted from an analog signal to a digital signal (process indicated as 'A/D conversion'), filtered, converted from an electric signal to an optical signal (process indicated as 'E/O conversion') and sent to the central unit CUa and CUb that performs signal processing operations at the physical layer (L1) and at the higher ISO-OSI layer protocols (RRC/RLC/MAC).

In the non-limiting example of FIG. 1, remote units RUa$_4$ and RUa$_5$ of cluster A serve respective cells, border cells 105na in the following, which are adjacent to border cells 105nb served by remote units RUb$_1$ and RUb$_2$ of cluster B.

According to an embodiment of the present invention, remote units RUa$_4$, RUa$_5$, RUb$_1$ and RUb$_2$ serving border cells 105na and 105nb, respectively, indicated as border remote units RUa$_4$, RUa$_5$, RUb$_1$ and RUb$_2$ in the following, are also connected to the central unit CUb and CUa, respectively, of the neighboring cluster B and A in addition to being connected to the central unit CUa and CUb of the respective cluster A and B.

Preferably, border remote units RUa$_4$, RUa$_5$, RUb$_1$ and RUb$_2$ are connected to the central unit CUb and CUa, respectively, of the neighboring cluster B and A by means of a direct connection.

A 'direct connection' is to be intended, in general, as a fast permanent connection, for example a point-to-point connection or a connection involving other nodes.

For example, border remote units RUa$_4$, RUa$_5$, RUb$_1$ and RUb$_2$ may be connected by means of respective additional fronthaul links to the to the central unit CUb and CUa of the neighboring cluster B and A, such as for example an additional fronthaul link 115ab connecting remote unit RUa$_4$ to the central unit CUb and an additional fronthaul link 115ba connecting remote unit RUb$_1$ to the central unit CUa shown in FIG. 1 (as dash-dot lines).

The connection of border remote units RUa$_4$, RUa$_5$, RUb$_1$ and RUb$_2$ with both the central units CUa and CUb allows the central units CUa and CUb managing in a coordinated manner the operations of border remote units RUa$_4$, RUa$_5$, RUb$_1$ and RUb$_2$ both belonging to their cluster A and B, respectively, and belonging to neighboring clusters A and B. In other words, the central units CUa and CUb manage an exchange of radiofrequency signals among border remote units RUa$_4$, RUa$_5$, RUb$_1$ and RUb$_2$ and user equipment located within the border cells 105na and 105nb.

In other words, the connection of border remote units RUa$_4$, RUa$_5$, RUb$_1$ and RUb$_2$ with both the central units CUa and CUb allows a shared and coordinated management of radio resources within the border cells 105na and 105nb, thus abating interference issues in the border cells 105nb caused by signals transmitted by border remote units RUa$_4$ and RUa$_5$ and/or user equipment served by them towards signals transmitted by border remote units RUb$_1$ and RUb$_2$ and/or user equipment served by them and, vice versa, interference issues in the border cells 105na caused by signals transmitted by border remote units RUb$_1$ and RUb$_2$ and/or user equipment served by them towards signals transmitted by border remote units RUa$_4$ and RUa$_5$.

It should be noted that embodiments of the invention envisage additional fronthaul links connecting bordering remote units with central units belonging to more than two neighboring clusters of a mobile telecommunication network.

Preferably, each border remote unit is advantageously connected to the central units of any neighboring clusters of a mobile telecommunication network. Each border remote unit is connected with central units of neighboring clusters having at least one border cell adjacent to at least one border cell served by the border remote unit.

In this way, the provisioning of services to user equipment in the border cells may be managed (as described in the following) by two or more (at most all) the central units of such neighboring clusters.

In other words, the direct connection between a generic border remote unit and central units of neighboring clusters allows the central units of neighboring clusters to manage communication, i.e. an exchange of data and service and/or control signaling, through the border remote unit together with the central unit of the cluster to which the generic border remote unit belongs.

Figure 2:
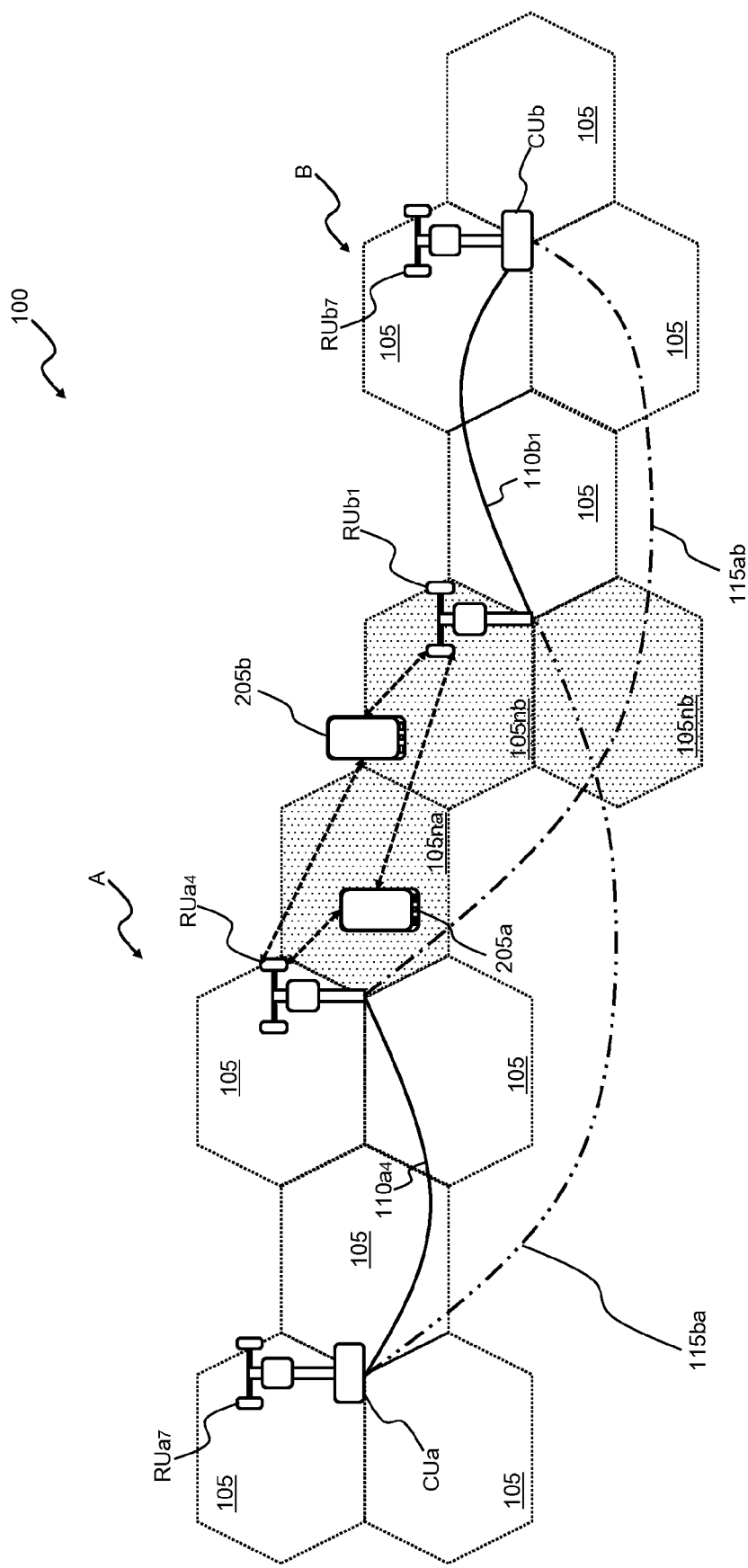
FIG. 2 is a schematic representation of a scenario in which remote units of neighboring clusters interact in order to provide services to user equipment.

FIG. 2 is a schematic representation of a scenario in which remote units $RUa_4$ and $RUb_1$ of neighboring clusters A and B cooperate in order to provide services to user equipment 205a and 205b.

It should be noted that, generally, border remote units, such as for example border remote units $RUa_4$ and $RUb_1$ shown in FIG. 2, can sense signals from, and transmit signals, beyond the respective served cells 105 of the respective clusters A and B.

For example, radio signals transmitted by border remote unit $RUa_4$ of cluster A may reach at least part of border cells 105nb served by border remote unit $RUb_1$ of cluster B and signal transmitted by a user equipment 205b within cell 105nb may be received by border remote unit $RUa_4$. Similarly, radio signals transmitted by border remote unit $RUb_1$ of cluster B may reach at least part of border cells 105na served by border remote unit $RUa_4$ of cluster A and signal transmitted by a user equipment 205a within cell 105na may be received by border remote unit $RUb_1$.

Generally, any one of border remote units, such as for example border remote units $RUa_4$ and $RUb_1$ may be exploited for serving user equipment 205a and 205b within one or more adjacent border cells 105na and 105nb regardless of the clusters A or B to which border remote units $RUa_4$ and $RUb_1$, and border cells 105na and 105nb belong.

Thanks to the fronthaul links 115ab and 115ba, the central units CUa and CUb may implement a coordinated management of the border remote units $RUa_4$ and $RUa_1$.

For example, in DL, central unit CUa of cluster A may select to send, through the fronthaul link 115ba, one or more baseband signals to the border remote unit $RUb_1$ of cluster B for being transmitted as corresponding radiofrequency signals to the user equipment 205a located in the border cell 105na, by which they are received in addition, or in alternative, to other radiofrequency signals transmitted by the remote unit $RUa_4$ that are based on baseband signals received from the central unit CUa of cluster A.

In UL, the border remote unit $RUb_1$ of cluster B receives radiofrequency signals transmitted by the user equipment 205a and, in its turn, transmits corresponding baseband signals to the central unit CUa of cluster A, where they are received in addition, or in alternative, to baseband signals transmitted by the remote unit $RUa_4$ that are based on radiofrequency signals transmitted by the same user equipment 205a.

Similarly, in DL, central unit CUb of cluster B may select to send, through the fronthaul link 115ab, one or more baseband signals to the border remote unit $RUa_4$ of cluster A for being transmitted as corresponding radiofrequency signals to the user equipment 205b located in the border cell 105nb, by which they are received in addition, or in alternative, to other radiofrequency signals transmitted by the remote unit $RUb_1$ that are based on baseband signals received from the central unit CUb of cluster B.

In UL, the border remote unit $RUa_4$ of cluster A receives radiofrequency signals transmitted by the user equipment 205b and, in its turn, transmits corresponding baseband signals to the central unit CUb of cluster B, where they are received in addition, or in alternative, to baseband signals transmitted by the remote unit $RUb_1$ that are based on radiofrequency signals transmitted by the same user equipment 205b.

For example, the selection of which border remote unit, between remote units $RUa_4$ and $RUb_1$, is exploited for radiating radiofrequency signals to the user equipment 205a and 205b, in LTE/LTE-A mobile telecommunication network 100, may be based on feedbacks from the user equipment 205a and 205b related to Cell Reference Signals (CRS) or other kind of Reference Signals, like e.g. the CSI-RS defined in LTE specifically for supporting CoMP. User equipment 205a and 205b receive Cell Reference Signals from remote units $RUa_4$ and $RUb_1$ and exploit them for estimating the channel state over the entire bandwidth provided by the remote units $RUa_4$ and $RUb_1$ for communications over the corresponding cell.

It should be noted that the additional fronthaul links 115ab and 115ba may be used to provide a connection between central units CUa and CUb of the neighboring clusters A and B. The connection may be exploited by the central units CUa and CUb for exchanging signals management information (e.g., PHY, MAC, RRC protocol layer information, such as for example scheduling grants, interference measurements, etc.) in order to manage the provision of services to user equipment 205a and 205b within the border cells 105na and 105nb in such a way to effectively implementing procedures capable of reducing 'inter-cluster' interferences and improving a Quality of Service (QoS) and/or a Quality of Experience (QoE) for the user equipment 205a and 205b.

Alternatively or in addition, a physical link (e.g., implemented with a dedicated optical fiber cable) may be provided for connecting central units CUa and CUb in order to exchange signals management information.

Figure 3A:
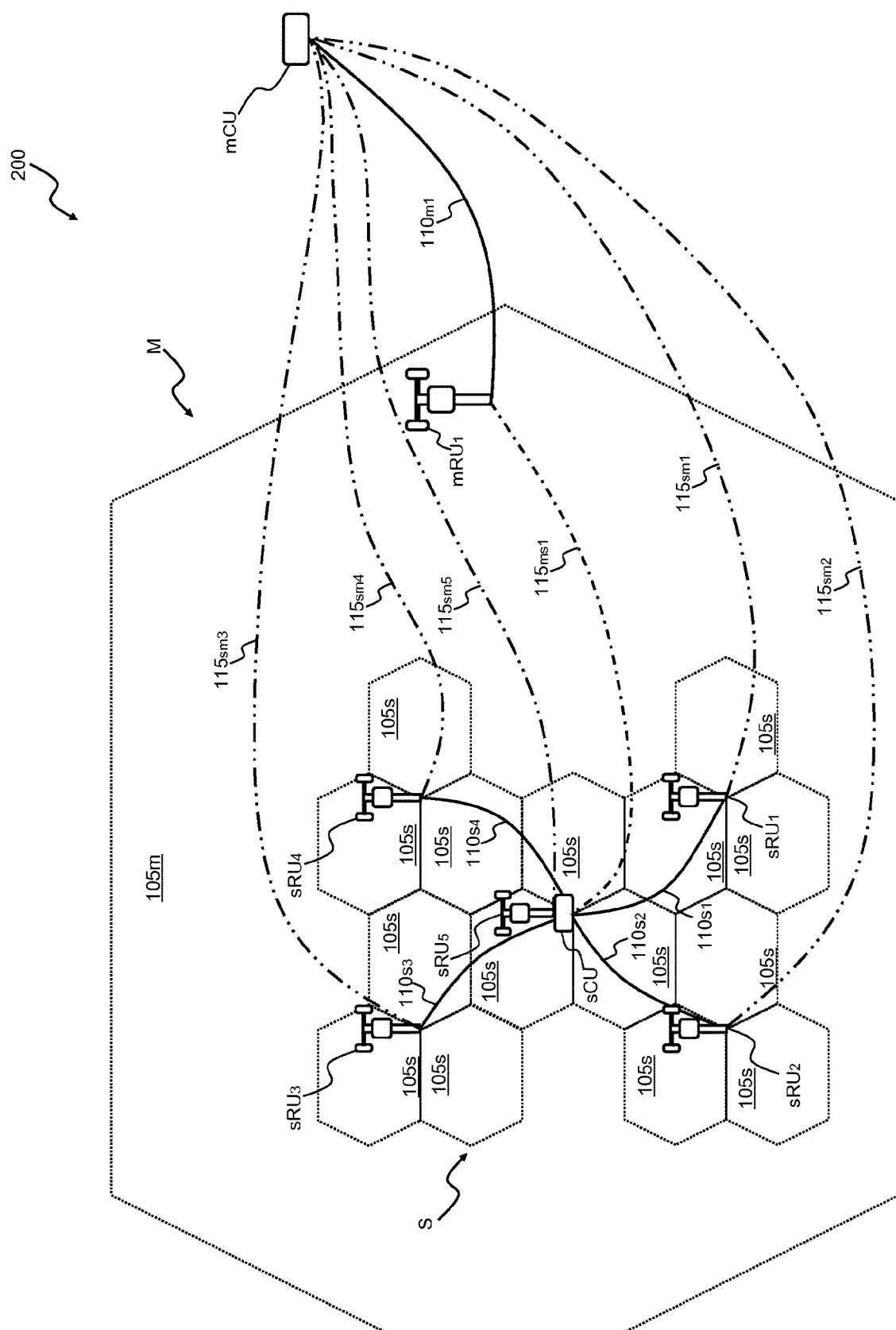
FIG. 3 is a schematic representation of portions of two neighboring clusters capable of implementing a cooperative carrier aggregation.

In other embodiments of the present invention, the clusters could be also partially and/or completely overlapped one another, such as for example in the case of a Heterogeneous Network 200 (HetNet) as shown for example in FIG. 3A.

Generally, in a Heterogeneous Network, small cells 105s (e.g., micro-cells, pico-cells, etc.) served by a clusters of network elements, i.e. central unit sCU and remote units $sRU_{1-5}$, forming a small cells cluster S, are overlapped by one or more larger cells, or macro-cells such as the macro-cell 105m in FIG. 3A, served by different network elements, i.e. one or more remote units, such as the remote unit $mRU_1$ shown in FIG. 3A, managed by a respective central unit mCU of a respective macro-cells cluster M.

In this case remote units $sRU_{1-5}$ serving the small cells 105s may be connected to the central unit mCU (which manages the operation of the remote unit $mRU_1$ serving the macro-cell 105m superimposed to the cluster of small cells 105s) through respective additional fronthaul links $115sm_{1-5}$, and viceversa the remote unit $mRU_1$ (serving the more macro-cells 105m superimposed to the cluster of small cells 105s) may be connected to the central unit sCU of the cluster serving the small cells 105s through a respective additional fronthaul link $115ms_1$.

Figure 3B:
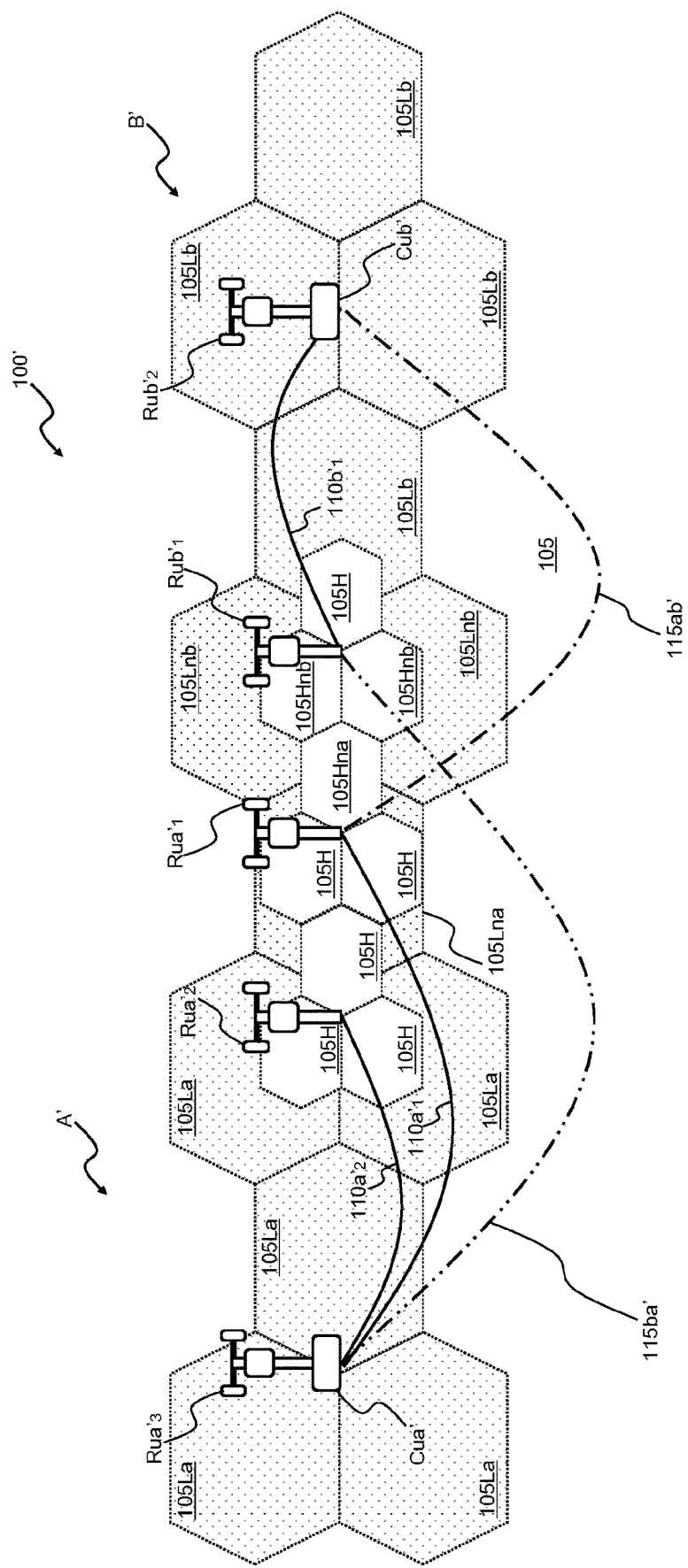

In alternative or in addition, the cloud architecture according to an embodiment of the invention may also implement an inter-cluster, or cooperative, Carrier Aggregation (CA). For example, FIG. 3B is a schematic representation of portions of two neighboring clusters A' and B' capable of implementing a cooperative carrier aggregation.

The mobile telecommunication network 100' implements radiofrequency signals transmission at two frequency layers. Preferably, a first frequency layer is at a lower frequency range, e.g. selected in a frequency range below 1 GHz, such as for example centered at 800 MHz, while a second frequency layer is at a higher frequency range, e.g. selected in a frequency range above 1 GHz, such as for example centered at 1800 MHz.

As known, radiofrequency signals transmitted at the first frequency layer have a longer range than the range of radiofrequency signals transmitted at the second frequency layer (wherein the radiofrequency signals ranges are determined by a plurality of factors such as, for example, transmission power, environment condition, and receivers sensitivity, etc.). In other words, first frequency layer cells $105_L$ associated with the first frequency layer have a greater extension than second frequency layer cells $105_H$ associated with the second frequency layer.

Therefore, the carrier aggregation may be implemented within the area where radiofrequency signals transmitted at both frequency layers, i.e. the area where first frequency layer cells $105_L$ overlap the second frequency layer cells $105_H$, which substantially corresponds to the second frequency layer cells $105_H$.

In the example FIG. 3B, the border remote units $RUa_1'$ and $RUb_1'$ may be managed by both the central units CUa' and CUb' of the two clusters A' and B', respectively, in order to implement cooperative carrier aggregation in an area defined by second frequency layers border cells $105_{Hna}$ and $105_{Hnb}$.

Preferably, the central units CUa' and CUb' may implement a cooperative carrier aggregation by exchanging scheduling information in order to achieve a coordinated scheduling of communications at both the first frequency layer and the second frequency layer in the area defined by second frequency layers border cells $105_{Hna}$ and $105_{Hnb}$.

Therefore, the cooperative carrier aggregation allows enlarging a geographic area where carrier aggregation is implemented. Indeed, cooperative carrier aggregation may extend seamlessly between neighboring clusters A' and B', particularly over the area defined by second frequency layers border cells $105_{Hna}$ and $105_{Hnb}$.

Particularly, the cooperative carrier aggregation according to an embodiment of the invention may extend seamlessly over second frequency layers border cells, such as the second frequency layers border cell $105_{Hna}$ in FIG. 3B, which overlap border first frequency layer cells of different clusters, such as for example the first frequency border layer cell $105_{Lna}$ of the cluster A' and the first frequency border layer cells $105_{Lnb}$ of the neighboring cluster B' in FIG. 3B (which are overlapped by the second frequency layers border cell $105_{Hna}$).

In summary, central units CUa and CUb may both manage radio resources of the border remote units $RUa_4$, $RUa_5$, $RUb_1$ and $RUb_2$ thanks to the additional fronthaul links 115ab and 115ba. Advantageously, a shared scheduling procedure (for example, operated by one or more algorithms instantiated in central units CUa and CUb) may be exploited for managing radio resources between clusters A and B in order to avoid allocation of colliding and/or superimposed radio resources within the border cells 105na and 105nb served by the border remote units $RUa_4$, $RUa_5$, $RUb_1$ and $RUb_2$.

The border remote units of neighboring clusters according to the present invention, such as border remote units $RUa_4$, $RUa_5$, $RUb_1$ and $RUb_2$ of clusters A and B in FIG. 1, implement additional functionalities with respect to known remote units in order to be managed by more than one central unit, such as the central units CUa and CUb in FIG. 1, through the respective additional fronthaul links, such as the additional fronthaul links 115ab and 115ba in FIG. 1.

Functionalities implemented by border remote units $RUa_4$, $RUa_5$, $RUb_1$ and $RUb_2$ depends on how the sharing of radio resources is implemented by the central units CUa and CUb and on a functionality split implemented between a central unit and remote units connected thereto.

Figure 4:
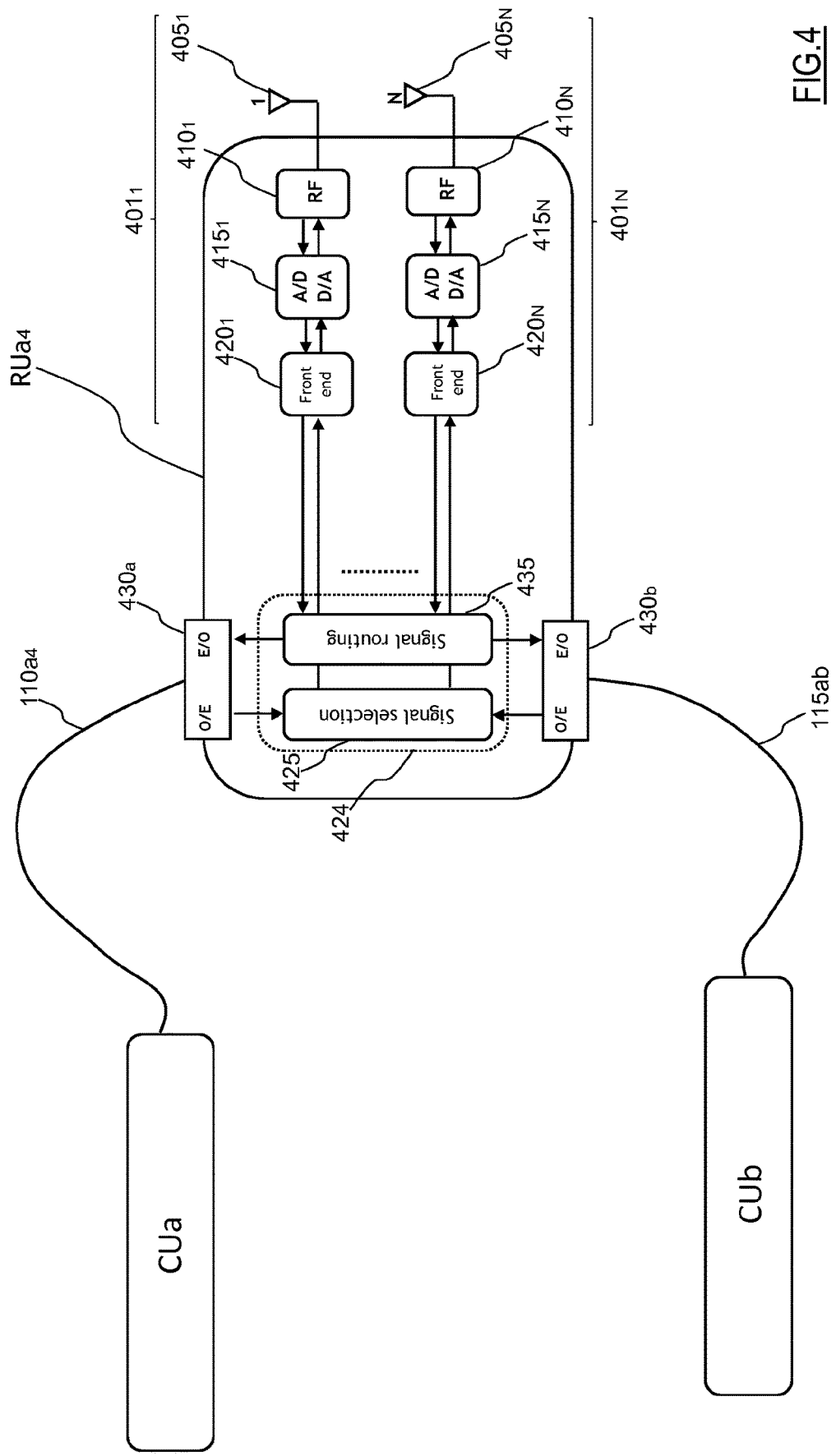
FIG. 4 is a schematic block diagram of a first structure of a remote unit connected with two central units of neighboring clusters according to an embodiment of the invention.

FIG. 4 is a schematic block diagram of a first structure of the border remote unit $RUa_4$, connected with two central units CUa and CUb of neighboring clusters A and B according to an embodiment of the invention.

It should be noted that the structure of border remote unit $RUa_4$ described in the following might apply to any other border remote units $RUa_5$, $RUb_1$ and $RUb_2$.

Border remote unit $RUa_4$ comprises a plurality of radio head transceivers $401n$ ($1 \le n \le N$, where N is a positive integer). Each radio head transceiver $401n$ comprises an antenna $405n$ for radiating radiofrequency signals. Each antenna $405n$ is coupled with a RF module $410n$ arranged for performing signals RF conversion in DL, signals down-conversion in uplink and signals amplification both in downlink and in uplink. Each RF module $410n$ is coupled with a digital to analog and analog to digital converter, or D/A-A/D converter $415n$, arranged for performing D/A conversion in downlink and A/D conversion in uplink. Each D/A-A/D converter $415n$ is coupled with a front-end module $420n$ for being filtered both in downlink and in uplink.

The border remote unit $RUa_4$ comprises a first coordinating member 424. According an embodiment of the invention, the first coordinating member 424 comprises a signal selection module 425 coupled with each front-end module $420n$ of the radio head transceiver $401n$. In downlink, the signal selection module 425 is arranged for receiving operating signals, such as for example baseband signals, provided by the two central units CUa and CUb and providing a processed signal (e.g., routing a selected baseband signal) to a selected radio head transceiver $401n$.

To this extent, the signal selection module 425 is coupled with a first optical-electric and electro-optical signal converter, or first O/E-E/O converter 430a and to a second O/E-E/O converter 430b. The first O/E-E/O converter 430a is connected to the fronthaul link $110a_4$ that connects the remote unit $RUa_4$ to the central unit CUa of cluster A for exchanging (optical) operating signals with the central unit CUa. Conversely, the second O/E-E/O converter 430b is connected to the additional fronthaul link 115ab that connects the border remote unit $RUa_4$ to the central unit CUb of cluster B for exchanging (optical) operating signals with the central unit CUb.

Similarly, border remote unit $RUa_4$ comprises a signal routing module 435 coupled with each front-end module $420n$ of the radio head transceiver $401n$. In UL, the signal routing module 435 is arranged for receiving baseband signal based on down-converted radiofrequency signals received by radio head transceiver $401n$ (e.g., transmitted by user equipment 205a and 205b) and routed to a corresponding central unit CUa or CUb.

To this extent, the signal routing module 435 is coupled with the first O/E-E/O converter 430a and with the second O/E-E/O converter 430b.

For example, in the LTE/LTE-A mobile telecommunication network 100, OFDMA/SC-FDMA signals in the time domain (i.e. after the IFFT or before the FFT) may be transmitted from/to the from the central units CUa and CUb to/from the border remote unit $RUa_4$ through the fronthaul link $110a_4$ or the additional fronthaul link 115ab, respectively, using operating signals, e.g. based on Common Public Radio Interface (CPRI) or Open Base Station Architecture Initiative (OBSAI) interfaces.

According to the present invention, a scheduling procedure adapted to manage operation of central units CUa and CUb and border remote units $RUa_4$, $RUa_5$, $RUb_1$ and $RUb_2$ envisages, in DL, exploiting the signal selection module 425 as a switch that selects between the OFDMA signals in the time domain, i.e. baseband signals, received from the central units CUa or CUb over the fronthaul link 110a4 or the additional fronthaul link 115ab, respectively.

The selected baseband signal is then transmitted to the radio head transceiver 401n radiating radiofrequency signals in the border cell 105na or 105nb (served or reached by the border remote unit $RUa_4$) where the recipient user equipment 205a or 205b is located.

Similarly, in UL the scheduling procedure envisages exploiting the signal routing module 435 for routing each down-converted radiofrequency SC-FDMA signal received by the border remote unit $RUa_4$ towards the corresponding central units CUa or CUb over the fronthaul link $110a_4$ or the additional fronthaul link 115ab, respectively.

In other words, the structure of the border remote units, such as the border remote unit $RUa_4$, and the scheduling procedure according to the present invention allow the border remote units, such as the border remote unit $RUa_4$, being selectively associated with different central units, such as the central units CUa and CUb.

In this way, a control of communication over the border cells 105na or 105nb (served or reached by border remote unit $RUa_4$) switches from the central unit CUa of cluster A to the central unit CUb of cluster B and vice versa depending on a spatial distribution of the network traffic. For example, a spatial distribution of the traffic is evaluated based on location and movement through the border cells 105na or 105nb of user equipment 205a and 205b, number of connection requests to cluster A and to cluster B. Preferably, control over border cells 105na and 105nb may be assigned to the cluster A or B that serves the larger number of user equipment in proximity of the borders of the adjacent clusters A and B. In an embodiment of the invention, control over border cells 105na and 105nb is assigned to the cluster A or B based on a number of served user equipment as a function of time.

Since a frequent switching of control from a central unit to another central unit may cause a drop of the active connections to user equipment managed by a cluster (e.g., if the control over border cell 105na is switched from cluster A to cluster B any communication between user equipment, such as the user equipment 205a in FIG. 2, within border cell 105na and managed by cluster A is interrupted), the switching of control may planned on a substantially long term basis (e.g., daily, weekly, monthly, etc.) according to communication traffic trends.

In an embodiment of the invention, the switching of control over border cells 105na and/or 105nb is planned based on an analysis of past communication traffic data.

Figure 5:
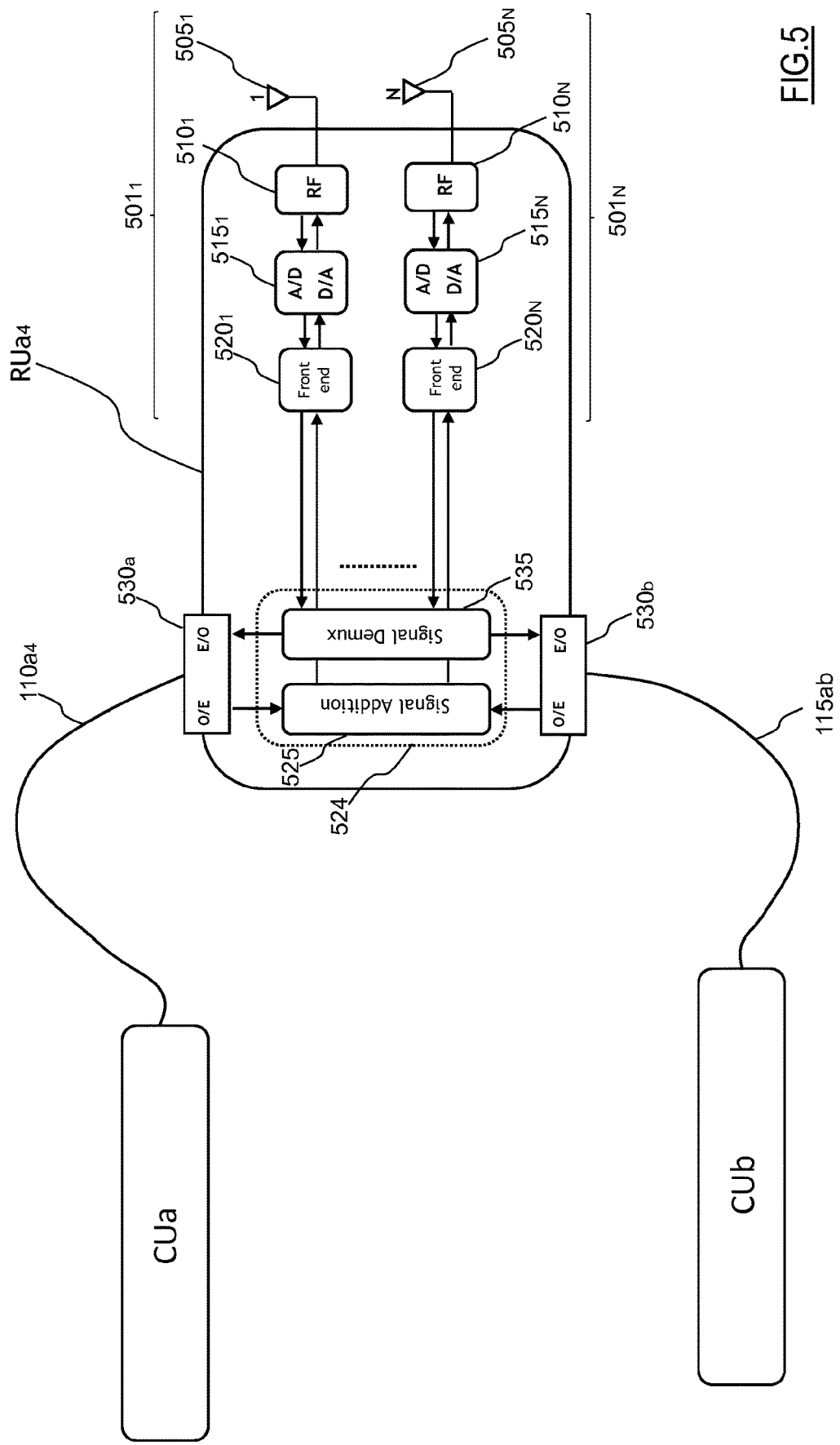
FIG. 5 is a schematic block diagram of a second structure of a remote unit connected with two central units of neighboring clusters according to another embodiment of the invention.

Turning to FIG. 5 it is a schematic block diagram of a second structure of remote unit $RUa_4$ connected with the two central units CUa and CUb of neighboring clusters A and B according to another embodiment of the invention.

The second structure of remote unit $RUa_4$ according to another embodiment of the invention differs from the first structure described above in what follows (wherein similar numeral references denote similar elements).

Border remote unit $RUa_4$ comprises a second coordinating member 524. According an embodiment of the invention, the second coordinating member 524 comprises a signal addition module 525 coupled with each front-end module 520n (instead of a signal selection module 425), and a signal de-multiplexer module 535 (instead of a signal routing module 435) coupled with each front-end module 520n.

Both the signal addition module 525 and a signal de-multiplexer module 530 are coupled with a first optical-electric and electro-optical signal converter, or first O/E-E/O converter 530a and with a second O/E-E/O converter 530b for exchanging (optical) operating signals with the central units CUa and CUb.

In DL, the signal addition module 525 is arranged for receiving operating signals in e.g. CPRI format provided by the two central units CUa and CUb, combining them together in a processed signal, e.g. a composite baseband signal, and route the composite baseband signal to a selected radio head transceiver 501n for being converted in a radiofrequency signal that is radiated by the antenna 505n of the selected radio head transceiver 501n.

For example, in the LTE/LTE-A mobile telecommunication network 100 according to an embodiment of the invention, a usage of radio resources, particularly OFDMA/SC-FDMA signals in the frequency domain, is coordinated among the central units, such as for example the central units CUa and CUb, i.e. central units CUa and CUb coordinate radio resources allocation in order to avoid overlaps among allocated radio resources in the frequency domain.

CPRI format signals transmitted by the central units CUa and CUb are received at the signal addition module 525 where they are converted into corresponding time-domain OFDMA signals and then added together for generating the composite baseband signal.

The addition of the OFDMA signals in the time domain creates a composite baseband signal whose spectrum is the superposition of the spectrum of the separate OFDMA signals.

Thus, each radiofrequency signal based on the corresponding composite baseband signal radiated by the selected radio head transceiver 501n of the border remote unit $RUa_4$ comprises information provided by both the central units CUa and CUb, thus enabling implementation of coordinated communication schemes for users equipment, such as the user equipment 205a and 205b in FIG. 2, located at the clusters borders. In other words, border remote unit $RUa_4$ may provide communications to user equipment 205a and 205b managed by clusters A and B at the same time.

In UL, the signal de-multiplexer module 535 decomposes down-converted radiofrequency signals provided by the radio head transceiver 501n of the border remote unit $RUa_4$ in the corresponding time-domain SC-FDMA signals, which are then converted in CPRI format signals and sent to the corresponding recipient central unit CUa or CUb through the fronthaul link 110a4 or 115ab, respectively (as optical signals converted by the O/E-E/O converters 530a or 530b).

In summary, the second structure of the border remote units, such as for example border remote unit $RUa_4$, and the coordinated sharing procedure of radio resource in the frequency domain among the central units, such as for example the central units CUa and CUb, according to an embodiment of the invention allows a real-time provisioning of services to user equipment, such as for example user equipment 205a and 205b, located within border cells 105na and 105nb served by cluster A and B, respectively, even if the communication with such user equipment is managed by a different neighboring cluster, such as cluster B or A, respectively.

Figure 6:
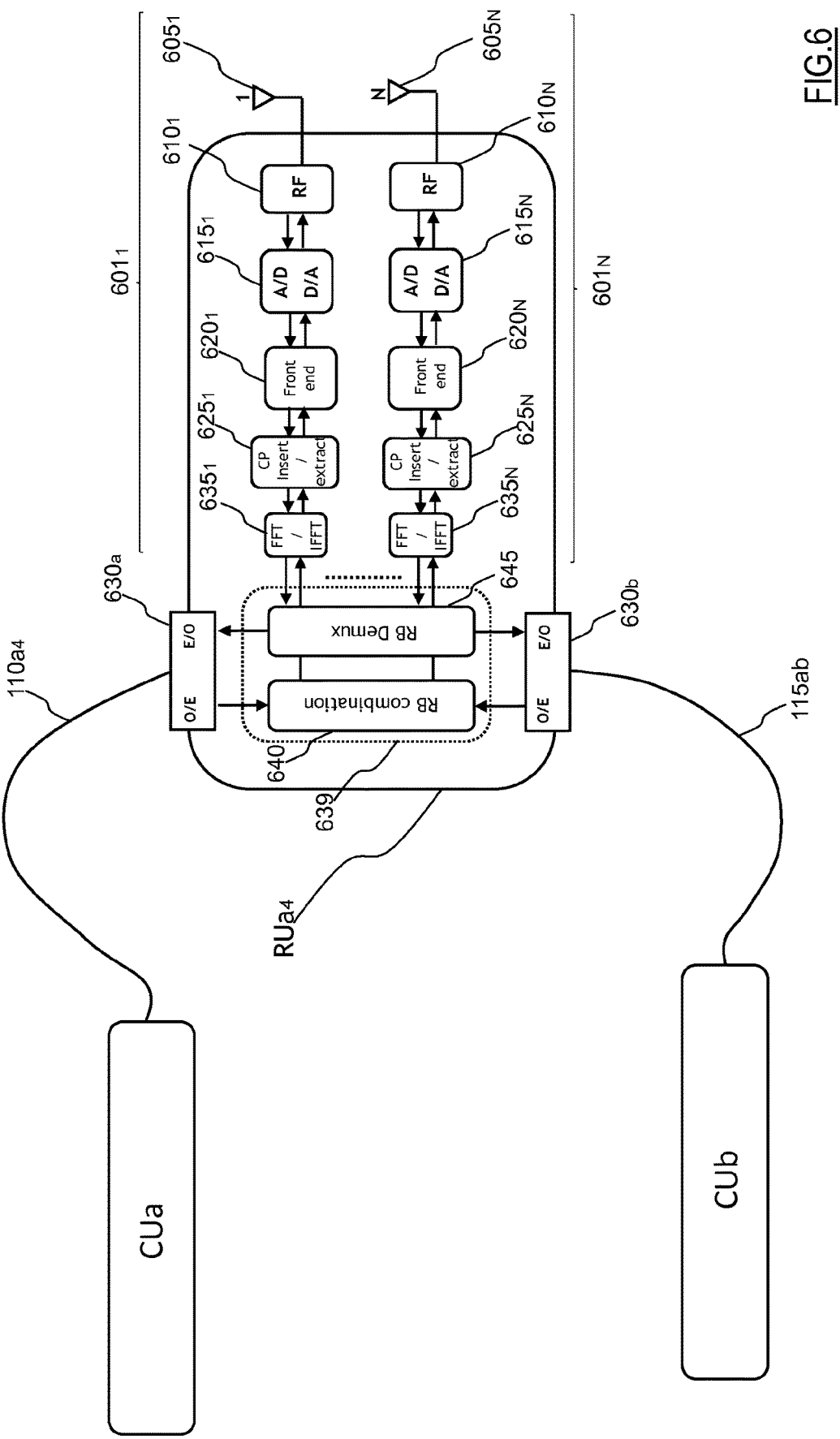
FIG. 6 is a schematic block diagram of a third structure of a remote unit connected with two central units of neighboring clusters according to yet another embodiment of the invention.

FIG. 6 is a schematic block diagram of a third structure of the border remote unit $RUa_4$ connected with the two central units CUa and CUb of neighboring clusters A and B according to yet another embodiment of the invention.

The third structure of border remote unit $RUa_4$ according to another embodiment of the invention differs from the first and second structures described above in what follows (wherein similar numeral references denote similar elements).

In the example of FIG. 6, a different functional split between the central units CUa and CUb, and the border remote unit RUa$_4$ is considered. For example, a functional split comprising a frequency domain management implemented at the border remote unit RUa$_4$ is considered, such as for example as taught in the International patent applications WO2010/075864 and WO2010/075865 of the same Applicant.

For example, in the LTE/LTE-A mobile telecommunication network 100 the border remote unit RUa$_4$ is arranged to manage basic radio resources, i.e. (Physical) Resource Blocks or RB, allocated to each user equipment 205a and 205b to be served.

In this case, each radio head transceiver 601n of the border remote unit RUa$_4$ further comprises a Cyclic Prefix, or CP insertion/extraction module 625n coupled with the front end module 620n and a Fast Fourier Transform/Inverse Fast Fourier Transform, or FFT/IFFT module 635n coupled with the CP insertion/extraction module 625n.

Moreover, the border remote unit RUa$_4$ comprises a third coordinating member 639. According an embodiment of the invention, the third coordinating member 639 comprises a Resource Block, or RB combination module 640 and a RB de-multiplexer module 645 both connected to the FFT/IFFT module 635n of each radio head transceiver 601n of the border remote unit RUa$_4$ for providing processed signals thereto.

Both the RB combination module 640 and the RB de-multiplexer module 645 are further coupled with a first O/E-E/O converter 630a and with a second O/E-E/O converter 630b for exchanging (optical) operating signals with the central units CUa and CUb, respectively.

The third structure of the border remote unit RUa$_4$ allows implementing more sophisticated signal processing algorithms at the border remote unit RUa$_4$ with respect to the first and second structures described above.

In DL, the RB combination module 640 composes combined OFDMA signals based on resource blocks received from both the central units CUa and CUb creating a combined signal in the frequency domain.

Subsequently, each combined OFDMA signal is passed to the FFT/IFFT module 635n and therefrom to the CP insertion module 625n that generate a corresponding baseband signal, which is in its turn sequentially processed by the front end module 620n, the D/A converter 615n, and the RF module 610n thus being converted in a radiofrequency signal that is radiated by the antenna 605n.

For example, in the LTE/LTE-A mobile telecommunication network 100 according to an embodiment of the invention, a usage of radio resources, particularly a resource block allocation, is coordinated among the central units, such as for example the central units CUa and CUb (i.e. the central units CUa and CUb allocate resources blocks in a non-conflicting manner).

In UL, the RB de-multiplexer module 645 decomposes SC-FDMA signals provided by the radio head transceivers 601n of the border remote unit RUa$_4$ in the constituting resource blocks which are converted in the CPRI format and sent to the corresponding recipient central unit CUa or CUb through the fronthaul link 110a4 or 115ab, respectively, as optical signals (converted by the O/E-E/O converters 630a or 630b).

In summary, the third structure of the border remote units, such as for example border remote unit RUa$_4$, and the coordinated allocation procedure of resource blocks among the central units, such as for example the central units CUa and CUb, according to an embodiment of the invention allows a real-time provisioning of services to user equipment, such as for example user equipment 205a and 205b, located within border cells 105na and 105nb even if such user equipment are served by different neighboring clusters, such as clusters A and B.

The third structure of the border remote unit RUa$_4$ and the coordinated allocation procedure of the central units CUa and CUb performed with RB resolution allows a highly precise and effective shared management of radio resources within the border cells 105na and 105nb.

It should be noted that the different functional splits between central units and border remote units may be implemented without departing from the scope of the invention.

Figure 7:
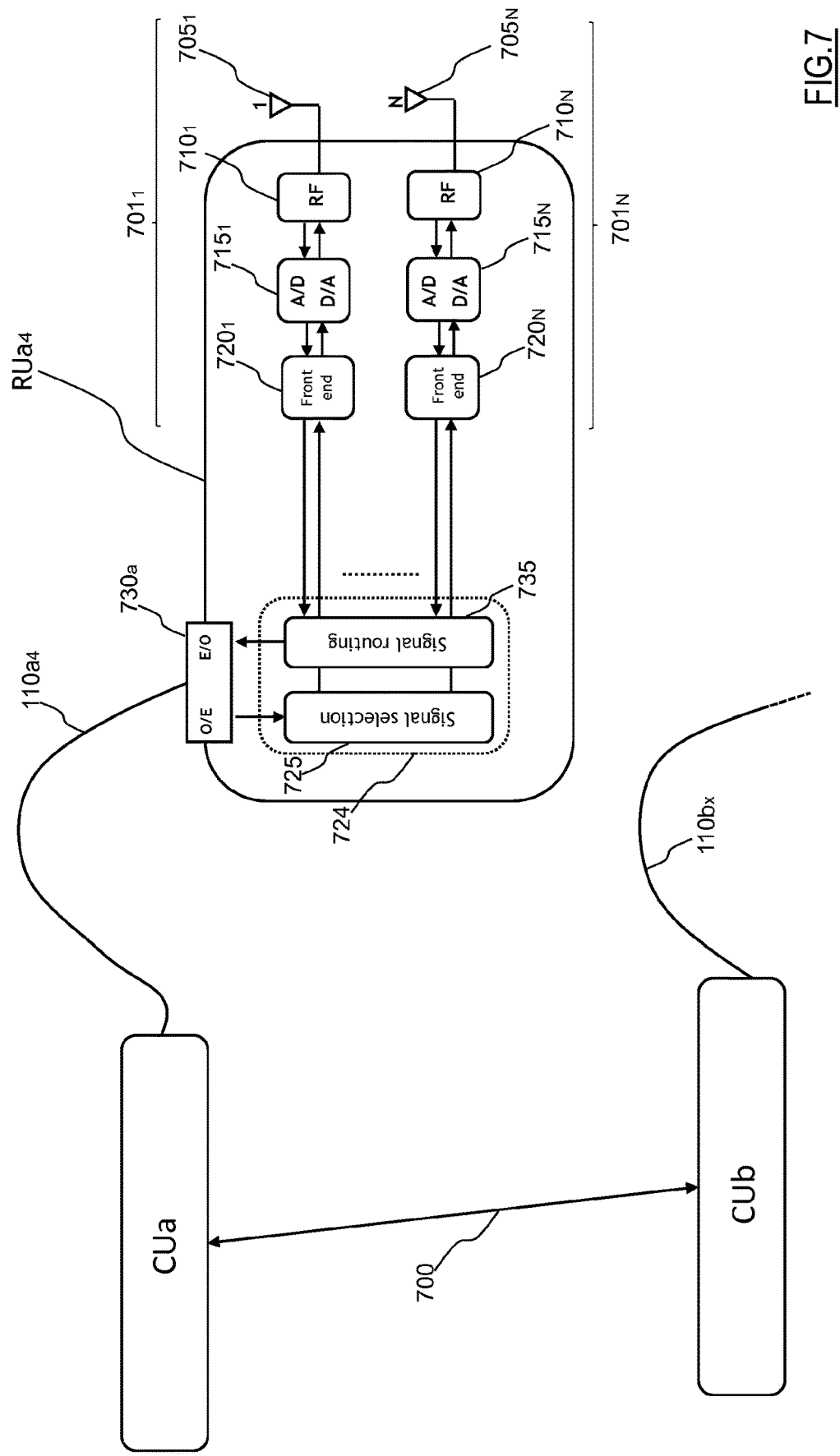
FIG. 7 is a schematic block diagram of an alternative structure of a fronthaul link connecting a remote unit with two central units of neighboring clusters according to an alternative embodiment of the invention.

FIG. 7 is a schematic block diagram of an alternative structure of fronthaul link connecting the border remote unit Ra$_4$ with the two central units CUa and CUb of neighboring clusters A and B according to an alternative embodiment of the invention.

The alternative structure of fronthaul link envisage a direct connection between central units CUa and CUb of neighboring clusters A and B.

For example, the direct connection between central units CUa and CUb may be provided by means of a CU-to-CU link 700, such as for example a physical connection comprising an optical fiber cable (even though a wireless connection is not excluded).

The CU-to-CU link 700 may be exploited for directly exchanging signals management information between central units CUa and CUb allowing a coordinated management of radio resources.

In an embodiment of the present invention, the CU-to-CU link 700 are be also exploited for providing a connection between the central unit CUb and the border remote unit Ra$_4$ through the central unit CUa and the fronthaul link 110a$_4$. Therefore, additional fronthaul links, such as the fronthaul link 115ab, which connect remote radio head units of a cluster with the central unit of a neighboring cluster are no longer required.

In this case, the CU-to-CU link 700 is designed to allow exchanging signals' management information and to allow to central unit CUb to transmit the signals related with the time/frequency resources managed by the central unit CUb to the central unit CUa.

Therefore, the CU-to-CU link 700 is designed with a sufficient capacity (e.g., allowing a bit rate in the order of Gb/s) in order to transmit high data rate signals (for example CPRI format signals) comprising allocation information exchanged by the central units CUa and CUb and transmission data (e.g., baseband signals, OFDMA/SC-FDMA signals or resource blocks according to the structure of the border remote unit Ra$_4$) allocated by the central unit CUb to be converted in, or portions of, radiofrequency signals radiated by the border remote unit Ra$_4$.

It should be noted that, even though the border remote unit Ra$_4$ in the example of FIG. 7 substantially has the first structure of border remote unit Ra$_4$ described above (apart for the absence of O/E-E/O converter 430b that is not needed), the CU-to-CU link 700 may be implemented to operate in cluster comprising border remote units with different structures.

It should be noted that the structures of border remote unit RUa$_4$ described above might be applied to any other border remote units RUa$_5$, RUb$_1$ and RUb$_2$ of the mobile telecommunication network 100.

Moreover, the structures of border remote unit Ra$_4$ are to be intended as non-limitative example; indeed, further different functional split (not shown) may be implemented among the central units CUa and CUb, and the border remote unit RUa$_4$ without departing from the scope of the present invention.

In a different embodiment of the present invention, the radio head transceivers of a generic border remote unit may be subdivided in two or more subsets, in such a way that the radio head transceivers of each subset are configured for radiating radiofrequency signals based on operating signals provided by a respective central unit connected to the border remote unit (e.g., through a corresponding additional fronthaul link). For example, a generic number x ($1 \leq x \leq N$) of the N radio head transceivers of the border remote unit Ra$_4$ may be configured for radiating radiofrequency signals based on operating signals provided by the central unit CUa and the remaining N-x radio head transceivers of the border remote unit Ra$_4$ may be configured for radiating radiofrequency signals based on operating signals provided by the central unit CUb. Advantageously, the number of radio head transceivers assigned to each subset may be dynamically or periodically determined based on actual traffic and/or known traffic patterns in the mobile telecommunication network 100.

It should be noted that all the members and/or modules comprised in the structures of the border remote unit RUa$_4$, according to the embodiments described above, may be implemented in the border remote unit RUa$_4$ as hardware units, such as for example by means of one or more ad hoc circuitries (e.g., comprising electronic components such as for example one or more microprocessors, ASICs, FPGAs, microcontroller, DSPs etc.) and/or implemented as firmware/software products instantiated in processing arrangement of the border remote unit RUa$_4$ (e.g., a processing arrangement comprising at least one general purpose/task specific processing unit and preferably volatile and/or non-volatile memories, etc.).

The invention claimed is:

1. A mobile telecommunication network comprising:
    a plurality of network elements, the network elements being divided into at least two clusters, each cluster comprising as network elements:
    a plurality of remote units, each remote unit including circuitry configured to exchange radiofrequency signals with a user equipment located within at least one respective served area;
    a central unit including circuitry configured to manage the exchange of radiofrequency signals between each remote unit and the user equipment located within the respective served area thereof; and
    a plurality of connections configured to operatively connect a respective remote unit with the central unit of a same cluster; and
    wherein at least one remote unit of a first cluster is further connected to the central unit of a second cluster, at least one respective served area of the at least one remote unit of the first cluster being adjacent to at least one further respective served area of a further remote unit of the second cluster, the at least one remote unit of the first cluster being disposed on a boundary between the first and second clusters, and
    both the central unit of the first cluster and the central unit of the second cluster reduce interference between adjacent cells of the first and second clusters by implementing cooperative carrier aggregation through exchanging scheduling information relating to respective remote units of the first cluster and the second cluster, thereby managing communication between the at least one remote unit and the user equipment.

2. The mobile communication network according to claim 1, wherein the at least one remote unit of the first cluster is further connected to the central unit of the second cluster by a direct connection.

3. The mobile communication network according to claim 2, wherein the direct connection comprises an optical fiber cable.

4. The mobile communication network according to claim 2, wherein the central unit of the first cluster and the central unit of the second cluster are configured to exchange coordination information through:
    the direct connection connecting the central unit of the second cluster with the at least one remote unit,
    the at least one remote unit, and
    the connection operatively connecting the at least one remote unit with the central unit of the first cluster.

5. The mobile communication network according to claim 1, wherein the central unit of the first cluster is connected to the central unit of the second cluster by a further direct connection.

6. The mobile communication network according to claim 5, wherein the central unit of the first cluster and the central unit of the second cluster are configured to exchange coordination information through the further direct connection.

7. The mobile communication network according to claim 5, wherein the at least one remote unit of the first cluster is further connected to the central unit of the second cluster through:
    a respective connection operatively connecting the at least one remote unit with the central unit of the first cluster,
    the central unit of the first cluster, and
    the further direct connection connecting the central unit of first cluster with the central unit of the second cluster.

8. The mobile communication network according to claim 1, wherein the plurality of remote units are configured to exchange the radiofrequency signals at two frequency layers of which a first frequency layer comprises a corresponding first frequency range lower than a second frequency range of a second frequency layer, and
    wherein the central unit of the first cluster and the central unit of the second cluster coordinately manage the least one remote unit to exchange the radiofrequency signals at both the first frequency layer and the second frequency layer.

9. The mobile telecommunication network according to claim 1, wherein the central unit of the first cluster is connected to the central unit of the second cluster by a front-haul fiber link.

10. A network element of a mobile telecommunication network, the network element comprising:
    at least one radio head transceiver configured to generate and radiate radiofrequency signals to user equipment located within at least one served area, the at least one radio head transceiver being disposed on an edge of the at least one served area; and
    a coordinating circuit connected to at least two further network elements and configured to receive operating signals therefrom, and connected to the at least one radio head transceiver to provide processed signals thereto, based on the received operating signals;
    wherein the radiofrequency signals are generated by the at least one radio head transceiver based on the processed signals, and
    the at least two further network elements jointly reduce interference from the at least one radio head transceiver by implementing cooperative carrier aggregation through exchanging scheduling information relating to respective remote units of a first cluster and a second cluster, thereby managing radiofrequency signal radiation from the at least one radio head transceiver.

11. The network element according to claim 10, wherein the operating signals received from the at least two further network elements comprise signals in a time domain, and
wherein the coordinating circuit comprises a signal selection circuit configured to select signals received from a first further network element or from a second further network element of the at least two further network elements as the processed signals to be provided to the at least one radio head transceiver.

12. The network element according to claim 11, wherein the at least one radio head transceiver is configured to receive radiofrequency signals and convert the received radiofrequency signals into down-converted signals, and
wherein the coordinating circuit comprises a signal routing circuit configured to receive the signals in the time domain from the at least one radio head transceiver and provide each signal in the time domain to the first further network element or to the second further network element.

13. The network element according to claim 10, wherein the operating signals received from the at least two further network elements comprise signals in a frequency domain, and
wherein the coordinating circuit comprises a signals addition circuit configured to add the signals in the frequency domain in a processed signal to be provided to the at least one radio head transceiver.

14. The network element according to claim 11, wherein the at least one radio head transceiver is configured to receive radiofrequency signals and convert the radiofrequency signals into corresponding down-converted signals, and
wherein the coordinating circuit comprises a signal de-multiplexer circuit configured to receive the down-convened signals from the at least one radio head transceiver and decompose each down-converted signal into corresponding signals in the frequency domain and provide each signal in the frequency domain to the first further network element or to the second further network element.

15. The network element according to claim 10, wherein the operating signals received from the at least two further network elements comprise resource blocks, and
wherein the coordinating circuit comprises a resource blocks combining circuit configured to combine resource blocks in a processed signal to be provided to the at least one radio head transceiver.

16. The network element according to claim 15, wherein the at least one radio head transceiver is configured to receive the radiofrequency signals and convert the radiofrequency signals into corresponding signals, and
wherein the coordinating circuit comprises a resource block de-multiplexer circuit configured to receive the corresponding signals from the at least one radio head transceiver and decompose each signal into corresponding resource blocks and provide each resource block to the first further network element or to the second further network element of the at least two further network elements.

17. A method of managing network elements of a telecommunication network, the network elements being divided into at least two clusters each cluster including as network elements:
a plurality of remote units, each remote unit including circuitry configured to exchange radiofrequency signals with user equipment located within at least one respective served area, and a central unit including circuitry configured to manage the exchanging radiofrequency signals between each remote unit and the user equipment located within the respective served area thereof, the method comprising:
receiving, at an at least one remote unit, operating signals from a first central unit of a first cluster and from a second central unit of a second cluster, the at least one remote unit being disposed on a boundary between the first and second clusters;
processing, at the at least one remote unit, the operating signals from the first central unit and from the second central unit for providing at least one corresponding radio frequency signal; and
radiating, at the at least one remote unit, the at least one corresponding radiofrequency signals over the at least one respective served area,
wherein the first central unit and the second central unit both reduce interference generated by the at least one remote unit by implementing cooperative carrier aggregation through exchanging scheduling information relating to respective remote units of the first cluster and the second cluster, thereby managing the radiating of the at least one corresponding radiofrequency signals by the at least one remote unit.

18. The method according to claim 17, further comprising:
having the first central unit of the first cluster and the second central unit of the second cluster exchange respective signals management information; and
having both the first central unit of the first cluster and the second central unit of the second cluster generate the operating signals based on the exchanged signals management information to reduce interference between at least one corresponding radiofrequency signals radiated by the at least one remote unit and radiofrequency signals radiated by a further remote unit of the second cluster.

19. The method according to claim 18, wherein signals management information comprises scheduling grants and/or interference measurements referred to radiofrequency signals exchanged with user equipment within the at least one respective served area and the at least one further respective served area.

* * * * *